Patented Aug. 13, 1940

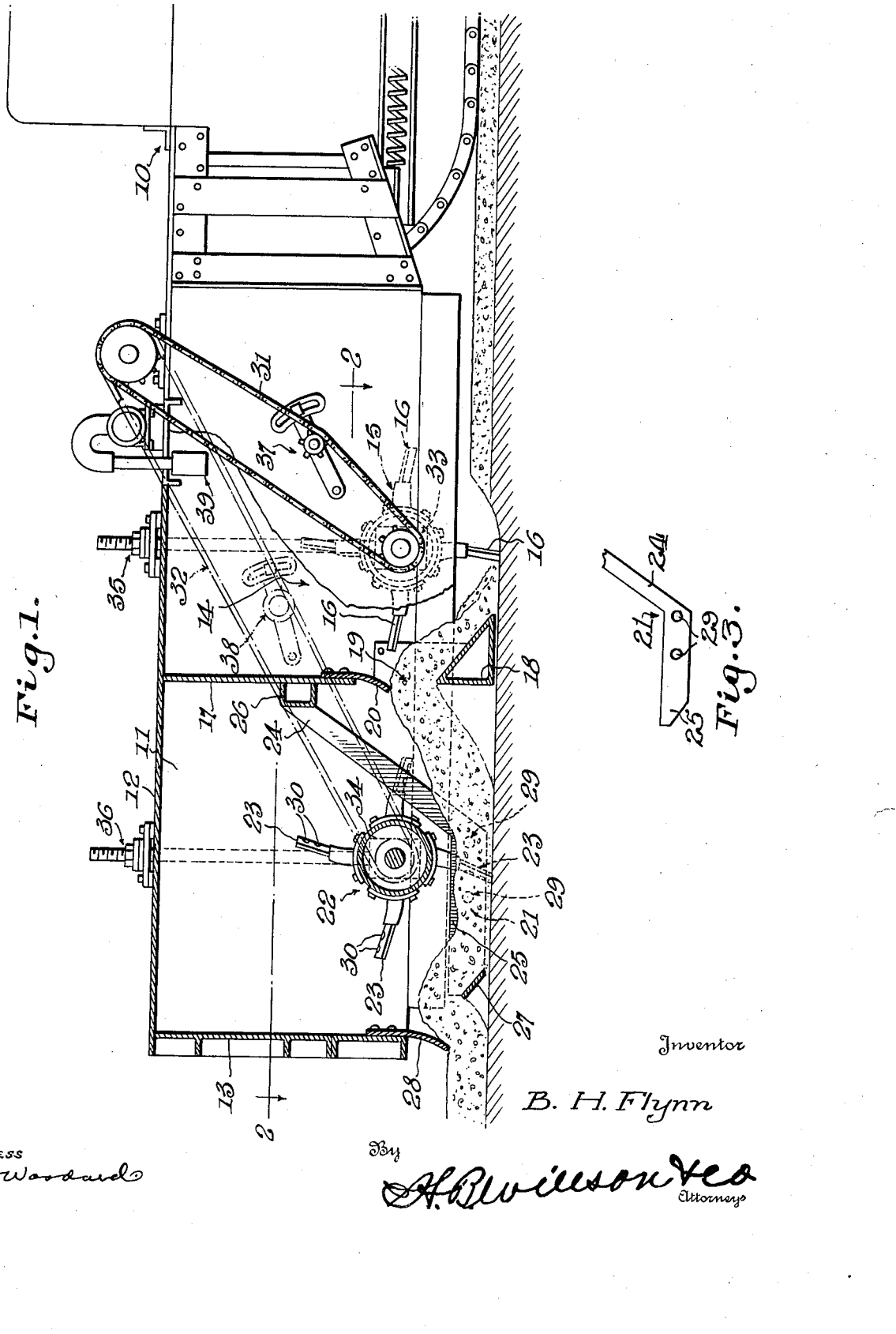

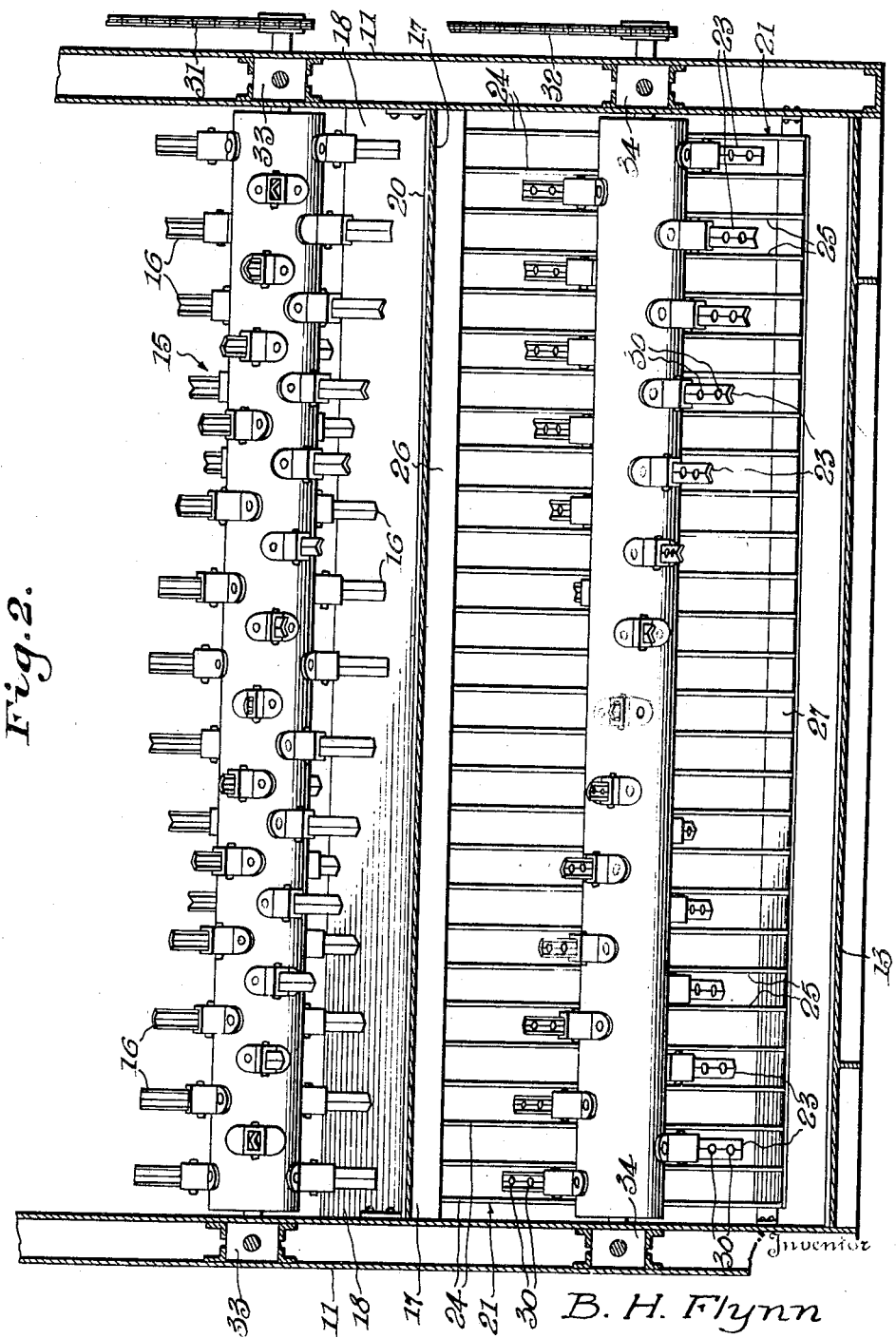

2,211,263

UNITED STATES PATENT OFFICE 2,211,263

ROAD MAKING MACHINE

Benjamin H. Flynn, Alexandria, La.

Application April 1, 1939, Serial No. 265,529

8 Claims. (Cl. 94—39)

The invention relates to a new and improved road making machine for such purposes as disintegrating an old roadway, mixing one or more liquid or dry ingredients with the disintegrated road material and leaving the mixed materials in readiness for compaction; disintegrating a strip of natural soil, mixing one or more liquid or dry ingredients therewith and leaving the mixed materials ready for compaction; merely mixing materials spread upon a grade upon which a road is to be constructed and leaving them in readiness for compaction.

The object of the invention is to provide a relatively simple machine for thoroughly performing the desired function in an expeditious and inexpensive manner.

With the foregoing in view, the invention resides in the novel subject matter hereinafter described and claimed, description being accomplished by reference to the accompanying drawings.

Figure 1 is a side elevation partly in vertical section, some of the teeth 23 being omitted from the shaft or drum 22.

Figure 2 is a horizontal sectional view on lines 2—2 of Figure 1.

Fig. 3 is a fragmentary side elevation of one of the L-shaped material slitting blades.

The machine is of mobile nature and preferably includes an endless tread tractor unit 10 from which two side members 11 of a rigid frame extend rearwardly, the upper edges of said side members 11 being connected by suitable cover plates 12 and the rear ends of said side members being connected by a transverse rigid wall 13. The front portion of the space under the cover 12 forms a hood 14 in which a transverse rotary cutter 15 is mounted, said cutter having projecting teeth 16 for either disintegrating an old road or a strip of earth over which the machine is propelled, or for merely mixing spread materials upon a grade on which a road is to be constructed. The hood 14 is provided with a rear wall 17, the lower portion 18 of which is in the form of a scraper to forwardly scrape fine material left upon the bottom of the cut and hold such material within reach of the teeth 16 for re-mixture with the materials being disintegrated or mixed for the first time. The wall 17 is provided with a horizontal slot 19 through which the mixed materials discharge rearwardly, the upper edge of this slot being preferably provided with a flexible strip 20 of rubber belting or the like which rather evenly spreads the materials passing rearwardly through said slot.

Behind the wall 17, is a transverse gang of vertical blades 21 to continuously slit the mixed materials as the machine progresses, provision being made for further mixing these materials while they are confined between said blades. This mixing means preferably consists of a transverse rotary drum or shaft 22 extending between the side members 11 and having projecting teeth 23 receivable between the blades 21. Each of these blades, in the present disclosure, is of L-shape, being provided with an upwardly projecting portion 24 in front of the shaft or drum 22 and with a rearwardly projecting portion 25 under said shaft or drum. I have shown a transverse bar 26 suitably secured at its ends to the side members 11 and welded or otherwise fastened to the upper ends of the blade portions 24. A rear transverse plate 27 is also shown welded or otherwise secured to the rear extremities of the horizontal blade portions 25, said plate 27 being rearwardly inclined to elevate and drop the materials after they have been mixed by the teeth 23, thereby performing a final mixing operation. The material passing over this plate 26 discharges under the rear edge of the back wall 13, which edge is preferably provided with a flexible strip 28 of rubber belting or the like to smooth the surface of the material left in readiness for compaction.

By providing the blades 21 to continuously slit the previously mixed materials lying upon the bottom of the cut or the grade and by providing mixing means operable between said blades, the previously mixed material is still more thoroughly mixed while it is confined between said blades, providing for more thorough mixing than could otherwise be advantageously obtained.

When the mixing means cooperable with the blades 21 is in the form of a rotary mixer as in the present disclosure, the teeth 23 of said mixer are preferably of V-shaped cross-section to outwardly crowd the materials against the blades 21, producing a kneading, rolling and scrubbing action. The blades may well be provided with openings 29 through which some of the material is forced by the teeth 23 into the spaces between adjacent blades to be further acted upon by the teeth operating in said spaces. The teeth 23 may also be provided with openings 30 through which same of the materials may pass, the openings 29 and 30 giving much the same action as that produced by the conventional apertured mortar hoe.

For driving the rotary cutter 15 and the shaft or drum 22, any suitable provision may be made. For illustrative purposes, I have shown chains 31 and 32 for this purpose. It will also be understood that any desired provision may be made for mounting the cutter 15 and the drum or shaft 22 and for vertically adjusting same. I have, in a general way, illustrated bearings 33 for the cutter 15, bearings 34 for the shaft or drum 22, screw threaded adjusting means 35 for the bearings 33, and similar means 36 for the bearings 34. Suitable chain tighteners 37 and 38 have been illustrated for the chains 31 and 32 to take up slack in said chains upon vertical adjustment of the cutter 15 and shaft or drum 22.

Spray means has been indicated in a general way at 39 for spraying any desired liquid into the hood 14 to be initially mixed with the material or materials acted upon by the cutter 15, any desired provision being made for supplying the liquid to said spray means.

From the foregoing taken in connection with the accompanying drawings, it will be seen that the machine will advantageously perform the desired function, whether that function be disintegrating an old roadway, mixing one or more liquid or dry ingredients with the disintegrated road material and leaving the mixed materials in readiness for compaction; or disintegrating a strip of natural soil, mixing one or more liquid or dry ingredients therewith and leaving the mixed materials ready for compaction; or merely mixing materials spread upon a grade upon which a road is to be constructed and leaving the same in readiness for compaction. Whenever the materials are of such nature as to require pulverizing for proper mixing, the actions of the front and rear rotary members, the latter cooperating with the longitudinal blades, will produce the required pulverizing simultaneously with thorough mixing.

While the general construction and association of elements herein disclosed will advantageously obtain the desired ends, attention is invited to the fact that the disclosure is illustrative rather than limiting, it being possible to make numerous variations within the scope of the invention as claimed.

I claim:

1. A machine for mixing road materials, comprising a mobile frame for passage over the materials to be mixed, a transverse gang of vertical blades mounted on said frame for continuously slitting the materials, a transverse rotary shaft mounted on said frame near said blades, and projecting teeth on said shaft operable between said blades for further mixing the materials while they are confined between said blades, said teeth being almost as wide as the spaces between said blades, whereby each pair of blades confines the material acted upon by the tooth operable between the blades of said pair.

2. A machine for mixing road materials, comprising a mobile frame for passage over the materials to be mixed, a transverse gang of spaced vertical blades for continuously slitting the materials as the machine travels thereover, and a transverse rotary shaft on said frame having projecting teeth operable between said blades for mixing the materials while the latter are confined between said blades, said teeth being almost as wide as the spaces between said vertical blades and being shaped to crowd the materials in opposite directions against said blades.

3. A machine for mixing road materials, comprising a mobile frame for passage over the materials to be mixed, a transverse gang of spaced vertical blades for continuously slitting the materials as the machine travels thereover, and a transverse rotary shaft on said frame having projecting teeth operable between said blades for mixing the materials while the latter are confined between said blades, said teeth being of V-shaped cross-section to crowd the materials outwardly against said blades.

4. A machine for mixing road materials, comprising a mobile frame for passage over the materials to be mixed, a transverse gang of spaced vertical blades for continuously slitting the materials as the machine travels thereover, and a transverse rotary shaft on said frame having projecting teeth operable between said blades for mixing the materials while the latter are confined between said blades, said teeth being of V-shaped cross-section to crowd the materials outwardly against said blades, said blades being formed with openings through which some of the materials may pass.

5. A machine for mixing road materials, comprising a mobile frame for passage over the materials to be mixed, a transverse gang of spaced vertical blades for continuously slitting the materials as the machine travels thereover, and a transverse rotary shaft on said frame having projecting teeth operable between said blades for mixing the materials while the latter are confined between said blades, said teeth being almost as wide as the spaces between said vertical blades, and being shaped to crowd the materials in opposite directions against said blades, said blades having openings through which some of the materials are crowded by said teeth.

6. A machine for mixing road materials, comprising a mobile frame for passage over the materials to be mixed, a transverse gang of spaced vertical blades for continuously slitting the materials as the machine travels thereover, and a transverse rotary shaft on said frame having projecting teeth operable between said blades for mixing the materials while the latter are confined between said blades, said teeth being almost as wide as the spaces between said vertical blades, and being shaped to crowd the materials in opposite directions against said blades, said blades having openings through which some of the materials are crowded by said teeth, said teeth also having openings through which some of the materials may pass.

7. A machine for mixing road materials, comprising a mobile frame for passage over the materials to be mixed, a transverse gang of spaced vertical blades for continuously slitting the materials as the machine travels thereover, and a transverse rotary shaft on said frame having projecting teeth operable between said blades for mixing the materials while the latter are confined between said blades, said blades being of L-shape with their vertical portions extending upwardly in front of said shaft and their horizontal portions extending rearwardly under said shaft, said teeth being downwardly movable between said upwardly extending portions and rearwardly movable between said rearwardly extending portions.

8. A machine for mixing road materials, comprising a mobile frame for passage over the materials to be mixed, a transverse gang of spaced vertical blades for continuously slitting the materials as the machine travels thereover, means on said frame operable between said blades for mixing the materials while they are confined between said blades, and a transverse plate to which the rear ends of said blades are secured, said plate being rearwardly inclined to elevate the mixed materials and drop the same, thereby performing a further mixing operation.

BENJAMIN H. FLYNN.